United States Patent
Mihara

(10) Patent No.: US 10,992,640 B2
(45) Date of Patent: Apr. 27, 2021

(54) INFORMATION PROCESSING SYSTEM AND NON-TRANSITORY COMPUTER READABLE MEDIUM FOR MANAGING USER INFORMATION AND CHANGE REQUEST

(71) Applicant: FUJI XEROX CO., LTD., Tokyo (JP)

(72) Inventor: Makoto Mihara, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/540,467

(22) Filed: Aug. 14, 2019

(65) Prior Publication Data
US 2020/0304460 A1 Sep. 24, 2020

(30) Foreign Application Priority Data
Mar. 20, 2019 (JP) .............................. JP2019-053774

(51) Int. Cl.
*H04L 29/12* (2006.01)
*H04L 29/08* (2006.01)
*H04L 12/58* (2006.01)
*G06Q 10/10* (2012.01)
*G06Q 10/06* (2012.01)

(52) U.S. Cl.
CPC ............ *H04L 61/307* (2013.01); *H04L 51/28* (2013.01); *H04L 67/306* (2013.01); *G06Q 10/06* (2013.01); *G06Q 10/10* (2013.01); *H04L 67/2804* (2013.01)

(58) Field of Classification Search
CPC . H04L 41/5009; H04L 67/36; H04L 12/1895; H04L 41/0893; H04L 41/5025; G06Q 10/06; G06Q 10/107; G06Q 10/10
See application file for complete search history.

(56) References Cited

U.S. PATENT DOCUMENTS

| | | | | |
|---|---|---|---|---|
| 9,787,749 B2* | 10/2017 | Michie | ................ | G06F 16/23 |
| 10,073,904 B2* | 9/2018 | Zhou | .................. | G06F 16/2358 |
| 10,419,219 B1* | 9/2019 | Wieker | ........... | H04W 12/00503 |
| 2008/0294478 A1* | 11/2008 | Joshi | .................. | G06F 21/6218 |
| | | | | 726/4 |
| 2012/0166628 A1* | 6/2012 | Kullos | ............. | H04N 21/64322 |
| | | | | 709/224 |
| 2012/0195325 A1* | 8/2012 | Connelly | ................ | H04L 51/14 |
| | | | | 370/432 |
| 2013/0179560 A1* | 7/2013 | Kumar | ................ | G06F 11/3476 |
| | | | | 709/224 |
| 2014/0282619 A1* | 9/2014 | Michie | ................ | H04L 67/1004 |
| | | | | 719/318 |

(Continued)

FOREIGN PATENT DOCUMENTS

| | | |
|---|---|---|
| JP | 2018-005415 A | 1/2018 |
| JP | 2018-196058 A | 12/2018 |

*Primary Examiner* — David R Lazaro
(74) *Attorney, Agent, or Firm* — Oliff PLC

(57) ABSTRACT

An information processing system includes: a user information management section that manages user information for use when plural servers provide services on a network; and a control section that, when receiving a request to change the user information, performs control to change a method of notifying change of the user information, including at least a notification destination and a notification time specified for each service, based on a type of a service using the user information related to the change request and contents of the change of the user information according to the change request.

7 Claims, 7 Drawing Sheets

| NOTIFICATION LEVEL | NOTIFICATION TIME | NOTIFICATION MEDIUM | NOTIFICATION DESTINATION | ACCOMPANYING PROCESS |
|---|---|---|---|---|
| 1 | WHEN CHANGING USER INFORMATION | E-MAIL NOTIFICATION | TENANT ADMINISTRATOR | STOP CHANGED FUNCTION. IN CASE WHERE THERE IS APPROVAL OF TENANT ADMINISTRATOR, FUNCTION IS RE-EXECUTED. |
| 2 | WHEN CHANGING USER INFORMATION | E-MAIL NOTIFICATION | SERVICE ADMINISTRATOR | STOP CHANGED FUNCTION. IN CASE WHERE THERE IS APPROVAL OF SERVICE ADMINISTRATOR, FUNCTION IS RE-EXECUTED. |
| 3 | WHEN USING SERVICE | E-MAIL NOTIFICATION | CABINET ADMINISTRATOR | REQUEST APPROVAL OR RESETTING OF CABINET ADMINISTRATOR. |
| 4 | WHEN USING SERVICE | UI DISPLAY | USER | |
| 5 | UNNOTIFY | | | |

(56) References Cited

U.S. PATENT DOCUMENTS

| | | | | |
|---|---|---|---|---|
| 2015/0127678 A1* | 5/2015 | Zhou | ............ | G06F 16/2358 |
| | | | | 707/770 |
| 2015/0271167 A1* | 9/2015 | Kalai | ............ | H04L 63/083 |
| | | | | 726/6 |
| 2015/0317493 A1* | 11/2015 | Florez | ............ | H04W 12/02 |
| | | | | 713/155 |
| 2016/0156671 A1* | 6/2016 | Cabrera | ............ | H04L 63/107 |
| | | | | 726/1 |
| 2018/0083851 A1* | 3/2018 | Gravenites | ............ | G06F 9/5077 |
| 2019/0020635 A1* | 1/2019 | Selway | ............ | G06Q 20/4016 |
| 2019/0052728 A1* | 2/2019 | Cheng | ............ | H04L 67/22 |
| 2019/0097825 A1* | 3/2019 | Kan | ............ | H04L 12/1895 |
| 2019/0286832 A1* | 9/2019 | Szeto | ............ | H04L 63/102 |
| 2019/0306009 A1* | 10/2019 | Makovsky | ............ | G06Q 10/087 |
| 2020/0084171 A1* | 3/2020 | Gruhl | ............ | G06N 20/00 |
| 2020/0099760 A1* | 3/2020 | Schneyer | ............ | H04L 67/306 |
| 2020/0304460 A1* | 9/2020 | Mihara | ............ | H04L 61/307 |
| 2020/0328933 A1* | 10/2020 | Wu | ............ | H04L 67/2823 |

* cited by examiner

FIG. 2

| USER ID | NAME | E-MAIL ADDRESS | TELEPHONE NUMBER | AFFILIATED COMPANY NAME |
|---------|------|----------------|------------------|-------------------------|
| fx99999 | FUJI TARO | taro.fuji@example1.com | 9099999999 | A |
| fx99991 | FUJI HANAKO | hanako.fuji@example2.com | 9011111111 | B |

| NOTIFICATION LEVEL | NOTIFICATION TIME | NOTIFICATION MEDIUM | NOTIFICATION DESTINATION | ACCOMPANYING PROCESS |
|---|---|---|---|---|
| 1 | WHEN CHANGING USER INFORMATION | E-MAIL NOTIFICATION | TENANT ADMINISTRATOR | STOP CHANGED FUNCTION. IN CASE WHERE THERE IS APPROVAL OF TENANT ADMINISTRATOR, FUNCTION IS RE-EXECUTED. |
| 2 | WHEN CHANGING USER INFORMATION | E-MAIL NOTIFICATION | SERVICE ADMINISTRATOR | STOP CHANGED FUNCTION. IN CASE WHERE THERE IS APPROVAL OF SERVICE ADMINISTRATOR, FUNCTION IS RE-EXECUTED. |
| 3 | WHEN USING SERVICE | E-MAIL NOTIFICATION | CABINET ADMINISTRATOR | REQUEST APPROVAL OR RESETTING OF CABINET ADMINISTRATOR. |
| 4 | WHEN USING SERVICE | UI DISPLAY | USER | |
| 5 | UNNOTIFY | | | |

FIG. 4

| TENANT | SERVICE | BUSINESS IMPORTANCE | USER ID | USER INFORMATION IN USE | CONFIRMATION DATE | UPDATE DATE | NOTIFICATION LEVEL |
|---|---|---|---|---|---|---|---|
| A | TS | LARGE | fx99999 | E-MAIL ADDRESS | 8/22/2018 | 12/8/2018 | 1 |
| A | ET | MEDIUM | fx99999 | E-MAIL ADDRESS | 8/1/2018 | 12/8/2018 | 2 |
| A | CP | SMALL | fx99991 | LANGUAGE | 10/10/2018 | 6/30/2018 | 4 |

FIG. 7A

| TENANT | SERVICE | BUSINESS IMPORTANCE | USER ID | USER INFORMATION IN USE | CONFIRMATION DATE | UPDATE DATE | NOTIFICATION LEVEL |
|---|---|---|---|---|---|---|---|
| A | TS | LARGE | fx99999 | E-MAIL ADDRESS | 8/22/2018 | 12/8/2018 | 1 |
| A | ET | MEDIUM | fx99999 | E-MAIL ADDRESS | 8/1/2018 | 12/8/2018 | 2 |
| A | CP | SMALL | fx99991 | LANGUAGE | 10/10/2018 | 6/30/2018 | 4 |

FIG. 7B

| TENANT | SERVICE | BUSINESS IMPORTANCE | USER ID | USER INFORMATION IN USE | CONFIRMATION DATE | UPDATE DATE | NOTIFICATION LEVEL |
|---|---|---|---|---|---|---|---|
| A | CP | MEDIUM | fx99999 | E-MAIL ADDRESS | 8/22/2018 | 12/8/2018 | 2 |
| A | ET | MEDIUM | fx99999 | E-MAIL ADDRESS | 8/1/2018 | 12/8/2018 | 2 |

FIG. 7C

| TENANT | SERVICE | BUSINESS IMPORTANCE | USER ID | USER INFORMATION IN USE | CONFIRMATION DATE | UPDATE DATE | NOTIFICATION LEVEL |
|---|---|---|---|---|---|---|---|
| A | TS | LARGE | fx99999 | E-MAIL ADDRESS | 8/22/2018 | 12/8/2018 | 1 |
| B | TS | LARGE | fx99999 | E-MAIL ADDRESS | 8/1/2018 | 12/8/2018 | 1 | ced
INFORMATION PROCESSING SYSTEM AND NON-TRANSITORY COMPUTER READABLE MEDIUM FOR MANAGING USER INFORMATION AND CHANGE REQUEST

CROSS-REFERENCE TO RELATED APPLICATIONS

This application is based on and claims priority under 35 USC 119 from Japanese Patent Application No. 2019-053774 filed Mar. 20, 2019.

BACKGROUND

(i) Technical Field

The present disclosure relates to an information processing system and a non-transitory computer readable medium.

(ii) Related Art

In a system that manages user information and provides plural services to each user (for example, multi-tenant type cloud service), in a case where there is change of user information, it is necessary to notify the administrator with an approval authority of the change, and the change needs to be reflected in each service.

JP-A-2018-005415 discloses a technique of managing a transmission history for each combination of an organization name extracted from the text of an e-mail and an e-mail destination domain as user information, and in a case where there is no combination of an organization name extracted from an e-mail instructed to be transmitted and a destination domain in the managed combination, holding the transmission of the e-mail instructed to be transmitted and determining whether to permit transmission of the held e-mail.

JP-A-2018-196058 discloses a technique of introducing a mechanism to present the validity of a destination e-mail address according to a function used by the user, and allowing the user to check the validity of the destination e-mail address only in a case where the destination e-mail address is needed.

It may be required to control a notification destination and a timing of notification in a case where user information is changed, depending on a degree of importance of a function of a service and a type of changed user information.

SUMMARY

Aspects of non-limiting embodiments of the present disclosure relate to controlling notification of change of user information according to the degree of importance of the function of a service and the type of changed user information, in a system that manages the user information and provides plural services to each user.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system including: a user information management section that manages user information for use when plural servers provide services on a network; and a control section that, when receiving a request to change the user information, performs control to change a method of notifying change of the user information, including at least a notification destination and a notification time specified for each service, based on a type of a service using the user information related to the change request and contents of the change of the user information according to the change request.

BRIEF DESCRIPTION OF THE DRAWINGS

Exemplary embodiments of the present invention will be described in detail based on the following figures, wherein:

FIG. 2 is a diagram showing a configuration example of a user information management DB;

FIG. 3 is a diagram showing a configuration example of a notification method management DB;

FIG. 4 is a diagram showing a configuration example of an individual notification management DB;

FIGS. 7A to 7C are diagrams showing an application example of notification control according to the present exemplary embodiment, FIG. 7A is a diagram showing a state in which there are plural approvers regarding services of different importance levels, FIG. 7B is a diagram showing a state in which there are plural approvers regarding services of same importance level, and FIG. 7C is a diagram showing a state in which services are used for businesses of plural tenants and each tenant has an approver.

DETAILED DESCRIPTION

Hereinafter, an exemplary embodiment of the present disclosure will be described in detail with reference to the accompanying drawings.

System Configuration

An information processing system of the present exemplary embodiment receives a processing request from a tenant, and provides a service by executing processing according to the received processing request. A tenant is a logically divided unit of users who use services by the information processing system. That is, the tenant makes a processing request to the information processing system, and the processing by the information processing system is executed. A service in which plural tenants share a service provided by the information processing system is called a multi-tenant type service.

The user who uses the service belongs to any tenant. Then, each user requests a service with the authority assigned from the tenant to which the user belongs. The tenant can be set variously according to the contents, operation methods, or specifications of services provided by the information processing system, such as setting in association with a company or a department in a company, other organizations, or setting for each customer. As an example, in the present exemplary embodiment, it is assumed that a tenant is set for each company to which the user belongs.

Figure 1:
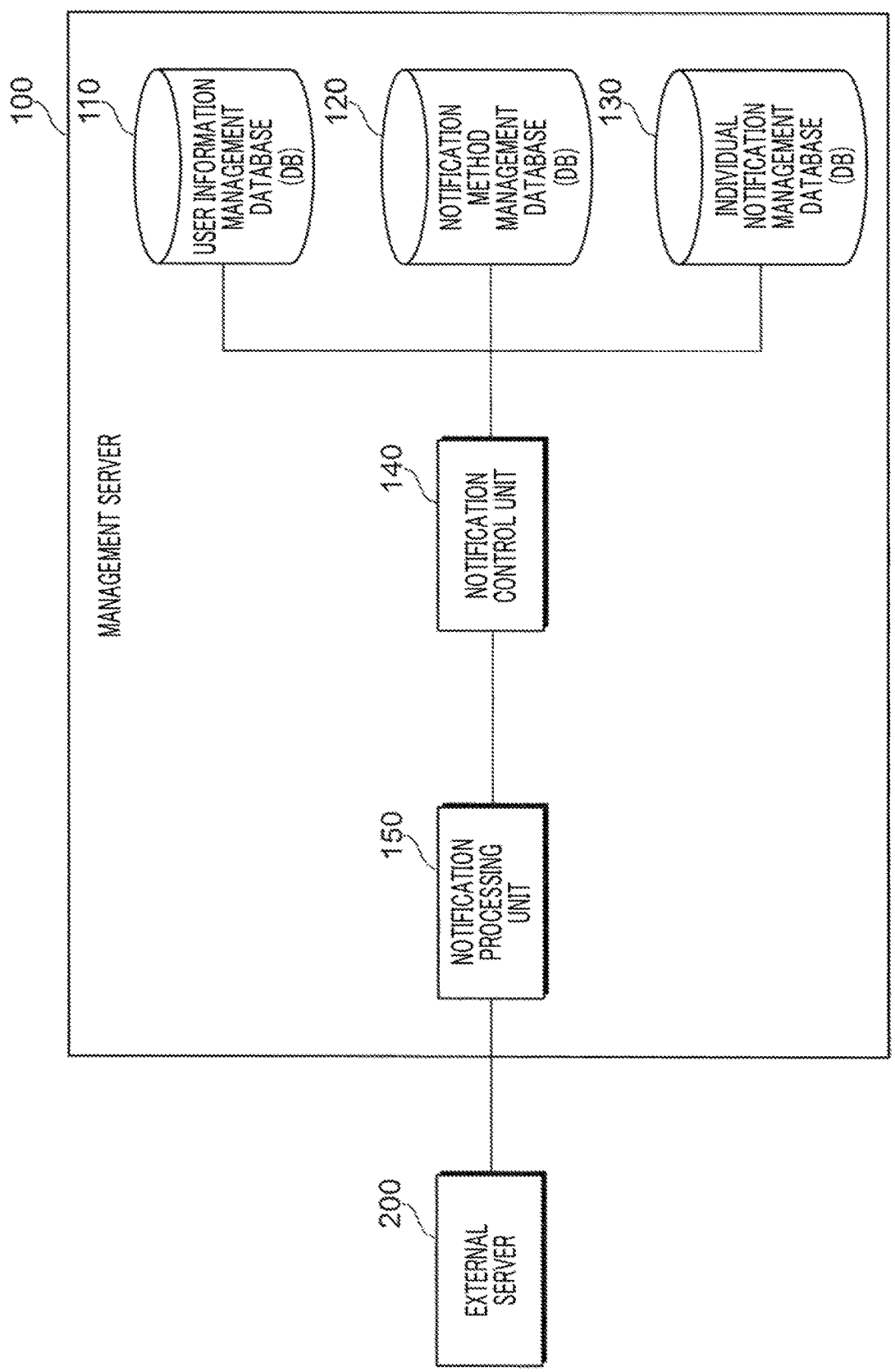
FIG. 1 is a diagram showing a configuration of an information processing system to which the present exemplary embodiment is applied.

FIG. 1 is a diagram showing a configuration of an information processing system to which the present exemplary embodiment is applied. The information processing system of the present exemplary embodiment is realized as a management server 100 that manages a tenant. The management server 100 includes a user information management database (DB) 110, a notification method management database (DB) 120, an individual notification management database (DB) 130, a notification control unit 140, and a notification processing unit 150.

The management server 100 is connected to an external server 200 as a service providing section that provides a service in response to a request from a tenant managed by the management server 100. The external server 200 uses information on individual users belonging to the tenant in the provided service. The type of user information used to provide a service is individually determined according to the type of service. Although one external server 200 is described in FIG. 1, actually, there are plural external servers 200 according to the type of service and the like.

The user information management DB 110 is a database that centrally manages user information on users who belong to the tenant managed by the management server 100 and use a service provided by the external server 200. The external server 200 uses the user information held in the user information management DB 110 to provide a service.

FIG. 2 is a view showing a configuration example of the user information management DB 110. Information corresponding to each item of "user ID", "name", "e-mail address", "telephone number", and "affiliated company name" is registered and held in the user information management DB 110 shown in FIG. 2 for each user. The user information management DB 110 shown in FIG. 2 exemplifies user information of a user with a user ID "fx99999" (name "Fuji Taro") and a user with a user ID "fx99991" (name "Fuji Hanako"). As described above, in the present exemplary embodiment, a tenant is set for each company to which the user individual belongs. Therefore, "affiliated company name" in the user information management DB 110 shown in FIG. 2 corresponds to the tenant.

The notification method management DB 120 is a database that manages a notification method in a case where user information is changed. In the notification method management DB 120, at least information for specifying a notification destination and a notification time is registered. Here, in a case where there is an approver for changing the user information, the approver is also included in the notification destination. The approver may be different for each item of changed user information.

FIG. 3 is a diagram showing the configuration example of the notification method management DB 120. The notification method management DB 120 shown in FIG. 3 records information on each item of "notification level", "notification time", "notification medium", "notification destination", and "accompanying process" according to the type of the notification method. In the notification method management DB 120 shown in FIG. 3, the "notification level" is an item indicating the type of notification method. Types of notification levels 1 to 5 are illustrated in the notification method management DB 120 shown in FIG. 3. In the illustrated example, there are five notification levels, but this is merely an example, and the number of notification levels may be four or less or six or more.

The "notification time" is set to a time when the user information is changed (described as "when changing user information" in FIG. 3), at notification levels 1, 2. Further, the notification time is set to a time when the service is used (described as "when using service" in FIG. 3), at notification levels 3, 4. Further, the notification time is set that notification is not performed, at notification level 5.

The "notification medium" is set to notification by electronic mail (described as "e-mail notification" in FIG. 3), at notification levels 1 to 3. Further, the notification medium is set to notification by display on a user interface (UI) screen displayed on a user information terminal when using service (described as "UI display" in FIG. 3), at notification level 4.

The "notification destination" is set to tenant administrator at notification level 1, service administrator at notification level 2, cabinet administrator at notification level 3, and users using service (described as "user" in FIG. 3) at notification level 4, respectively. Here, the tenant administrator is the administrator of the tenant to which the user having changed user information belongs. Further, the service administrator is an administrator of a service that uses the changed user information. The cabinet administrator is an administrator of the cabinet to which the user having changed user information belongs. The cabinet represents a group of users who use the service in the tenant. In a case where plural services are available in one tenant, a cabinet is set for each service.

The "accompanying process" is a process that is executed concomitantly when the notification is made. Based on the "accompanying process", it is indicated whether the notification destination is an approver. At notification level 1, a service providing function using the changed user information is stopped. Then, when there is an approval of the tenant administrator who is the notification destination, the function is re-executed, and the service provision is resumed. Therefore, the notification destination at notification level 1 is an approver. Further, at notification level 2, the service providing function using the changed user information is stopped. Then, when there is an approval of the service administrator who is the notification destination, the function is re-executed, and the service provision is resumed. Therefore, the notification destination at notification level 2 is an approver. Further, at notification level 3, the approval or resetting of the cabinet administrator who is the notification destination is requested. Here, resetting means performing setting change in provision of a service which is required along with change of user information. Therefore, the notification destination at notification level 3 is an approver. At notification levels 4, 5, processing that requires the approval of the notification destination is not set, and the notification destinations of these notifications are not an approver.

The individual notification management DB 130 is a database for individually managing the notification based on the change when the user information is changed. When the change of the user information is performed, the notification control unit 140 specifies a notification method for notifying of the change of the user information. Then, the specified notification method, the change content of the user information, and the information of the business importance specified according to the service using the changed user information are stored and managed in the individual notification management DB 130 in association with each other.

FIG. 4 is a diagram showing a configuration example of the individual notification management DB 130. In the individual notification management DB 130 shown in FIG. 4, the information of each item of "tenant", "service", "business importance", "user ID", and "user information in use", "confirmation date", "update date", and "notification level" for each notification performed in response to change of user information is recorded. In the individual notification management DB 130 shown in FIG. 4, "tenant" is a tenant to which a user having changed user information belongs, and "service" is a service that uses the changed user information. "Business importance" indicates the importance of the business using the service registered in the "service" item. In the illustrated example, three stages of "large", "medium", and "small" are shown as "business importance". The "user ID" is the identification information (ID) of the user whose user information has been changed, and the "user information in use" is the user information to be changed. The "confirmation date" is the date when the notification of the change of the user information is made (confirmed at the notification destination), and the "update date" is the date when the change of the user information is validated. The "notification level" indicates the type of adopted notification method, and corresponds to the "notification level" of the notification method management DB 120.

The notification control unit 140 receives a request to change user information, and determines a method for notifying of the change of user information. Specifically, when receiving a request to change user information, the notification control unit 140 specifies the content of the change based on the change request. Further, the notification control unit 140 specifies the type of service that uses the changed user information. Which information (items) of the user information is used by which service can be acquired from the external server 200 that provides each service. Further, based on the tenant to which the user corresponding to the changed user information belongs and the type of service using the changed user information, the notification control unit 140 specifies the importance of the business using this service. Then, the notification control unit 140 determines the notification method of the change of the user information, based on these types of information. Further, the notification control unit 140 stores these types of information and the determined notification method in the individual notification management DB 130 in association with each other.

Here, the importance of the business using the service may differ depending on the specific situation such as the business content of the entire organization that is the tenant, and how the service is used in the target business, even for the same service. Therefore, the business importance is determined in advance corresponding to the type of changed user information for each tenant and service, and the notification control unit 140 may specify the business importance for the type of the changed user information according to the received change request.

Further, regarding the change content of the user information, the notification time and notification medium to be selected differ depending on the type of the information (item) to be changed. For example, since changing the e-mail address may affect the service providing destination, the notification control unit 140 needs to promptly notify the notification destination by means such as e-mail after receiving the change request and obtain approval. On the other hand, in a case where the user information includes the language used by the user, the change in the language affects the language used when the service is provided, but the influence on the process for providing the service is considered to be small. Therefore, when the service is actually used, the user may be notified by UI display or the like. Thus, the notification control unit 140 determines the notification method, based on the item to be changed.

In addition, the notification control unit 140 may determine the notification method based on the contents of the items other than the items to be changed. As one example, when user information is changed, it is considered that the degree of influence of services using this user information on the business is different depending on the user position in the tenant where the user information is changed. For example, in the case where the user information of the user who has a job title in the tenant organization is changed and the case where the user information of members in the organization is changed, the former may have a greater influence on business. Therefore, for example, although not described in the user information management DB 110 shown in FIG. 2, it is assumed that the position (the presence or absence of a job title) of the user in the tenant (organization) is registered as an item of user information. Then, the notification control unit 140 may determine the notification method in consideration of not only the item to be changed but also information such as the position of the user who is the subject of the changed user information.

The notification processing unit 150 notifies each notification destination that there is a request to change user information according to the notification method determined by the notification control unit 140. Specifically, the notification processing unit 150 acquires a request to change user information from the notification control unit 140, and reads out information related to the acquired change request from the individual notification management DB 130. Further, the notification processing unit 150 refers to the notification method management DB 120 according to the notification level information read out from the individual notification management DB 130, and makes a notification according to the notification method of the corresponding notification level (notification time, notification medium, notification destination).

When an item of user information is changed, there may be plural services that use the information of the item. In this case, the notification processing unit 150 makes a notification of all corresponding services by the corresponding notification methods. At this time, when the notification level of any notification is any of notification levels 1 to 3 shown in the notification method management DB 120 shown in FIG. 3, in order to validate the change of user information, it is necessary to obtain approval by an approver which is a notification destination. Therefore, the notification processing unit 150 first makes a notification to the notification destination who is the approver, and makes a notification to the remaining notification destinations after the approver approves the change of the user information.

Further, for plural notification destination, a case is considered where there are plural approvers at notification level 1 or 2 shown in the notification method management DB 120 shown in FIG. 3. In this case, when the notification levels in the plural notifications are 1 or 2, the notification timing is the same "the time of the user information change", and both require the notification destination approval. Therefore, the notification processing unit 150 obtains the approval results from the plural approvers. However, when one approver approves the change of the user information and another approver disapproves the change of the user information, plural approval results are inconsistent. Therefore, when there are plural approvers at the notification destination, the notification processing unit 150 adopts the result of approval by the approver who is the notification destination related to the service with the highest business importance (the importance of the business using the service) among the services using the changed user information. That is, when the approver for the service with the highest business importance approves the change of the user information, the notification processing unit 150 validates the change of the user information regardless of the result of approval by the other approvers, and notifies the other unnotified destinations of notification of the change of the user information.

On the contrary, when the approver for the service with the highest business importance disapproves the change of the user information, the notification processing unit 150 invalidates the change of the user information regardless of the result of approval by the other approvers. In this case, the other unnotified notification destinations may not be notified.

Further, the case where there are plural notification destinations and there are plural services of the highest business importance will be discussed. In this case, the prioritized approval result cannot be specified in the above-described method using the business importance. Therefore, the notification processing unit 150 sets, as a special approver, a person having a higher authority in the tenant organization, over the plural approvers, and adopts the result of approval by the special approver. That is, when the special approver approves the change of the user information, the change of the user information is validated regardless of the results of approval by the other approvers, and the other unnotified notification destinations are notified of the change of the user information. On the contrary, when the special approver disapproves the change of the user information, the change of the user information is invalidated regardless of result of approval by other approvers.

Further, a case is considered where a service that uses changed user information is used for businesses of plural tenants. It is assumed that the business using this service in each tenant is of the same importance. In this case, in the above-described method of using the business importance, the prioritized approval result cannot be specified, and there is a tenant administrator in each of plural tenants, so there is no person having a higher authority. Therefore, the notification processing unit 150 adopts the result of approval by the approver who is the destination of notification of the service of the tenant to which the user having the changed user information belongs. That is, when the approver regarding the service of the tenant to which this user belongs approves the change of the user information, the notification processing unit 150 validates the change of the user information regardless of the result of approval by the other approvers, and notifies the other unnotified destinations of notification of the change of the user information. On the contrary, when the approver regarding the service of the tenant to which this user belongs disapproves the change of the user information, the notification processing unit 150 invalidates the change of the user information regardless of the result of approval by the other approvers.

As described above, although some examples have been described, it is not limited to the above method which approval result is to be adopted when there are plural approvers, but without being limited to the above method, it can be set specifically according to the operation policy of the business. For example, when different approval results are obtained from plural approvers, the approval results may be determined by consultation between the approvers rather than prioritizing the results of approval by a specific approver. In the above method, when there are plural approvers, one of the results of approval by the respective approvers is adopted. On the other hand, only one of the plural approvers (the special approver in the second method) may be notified to obtain an approval result.

The management server 100 configured as described above is realized by, for example, a server built on a network. The management server 100 may be realized by a single server machine or may be realized by plural servers by distributing functions. The service by the management server 100 may be provided as a so-called cloud service. In any case, the management server 100 includes a central processing unit (CPU) which is an arithmetic unit, and a main storage device (main memory) and an external storage device which are memory unit. The CPU reads the program stored in the external storage device into the main storage device and executes it. As the main storage device, for example, a random access memory (RAM) is used. As the external storage device, for example, a magnetic disk device, a solid state drive (SSD) or the like is used. As an example, the user information management DB 110, the notification method management DB 120, and the individual notification management DB 130 are realized by the external storage device. In addition, respective functions of the notification control unit 140 and the notification processing unit 150 are realized by the CPU executing a program. The user information management DB 110 is an example of a user information management section. The notification method management DB 120, the individual notification management DB 130, the notification control unit 140, and the notification processing unit 150 described above are examples of a control section.

Operations of Notification Control Unit and Notification Processing Unit

Figure 5:
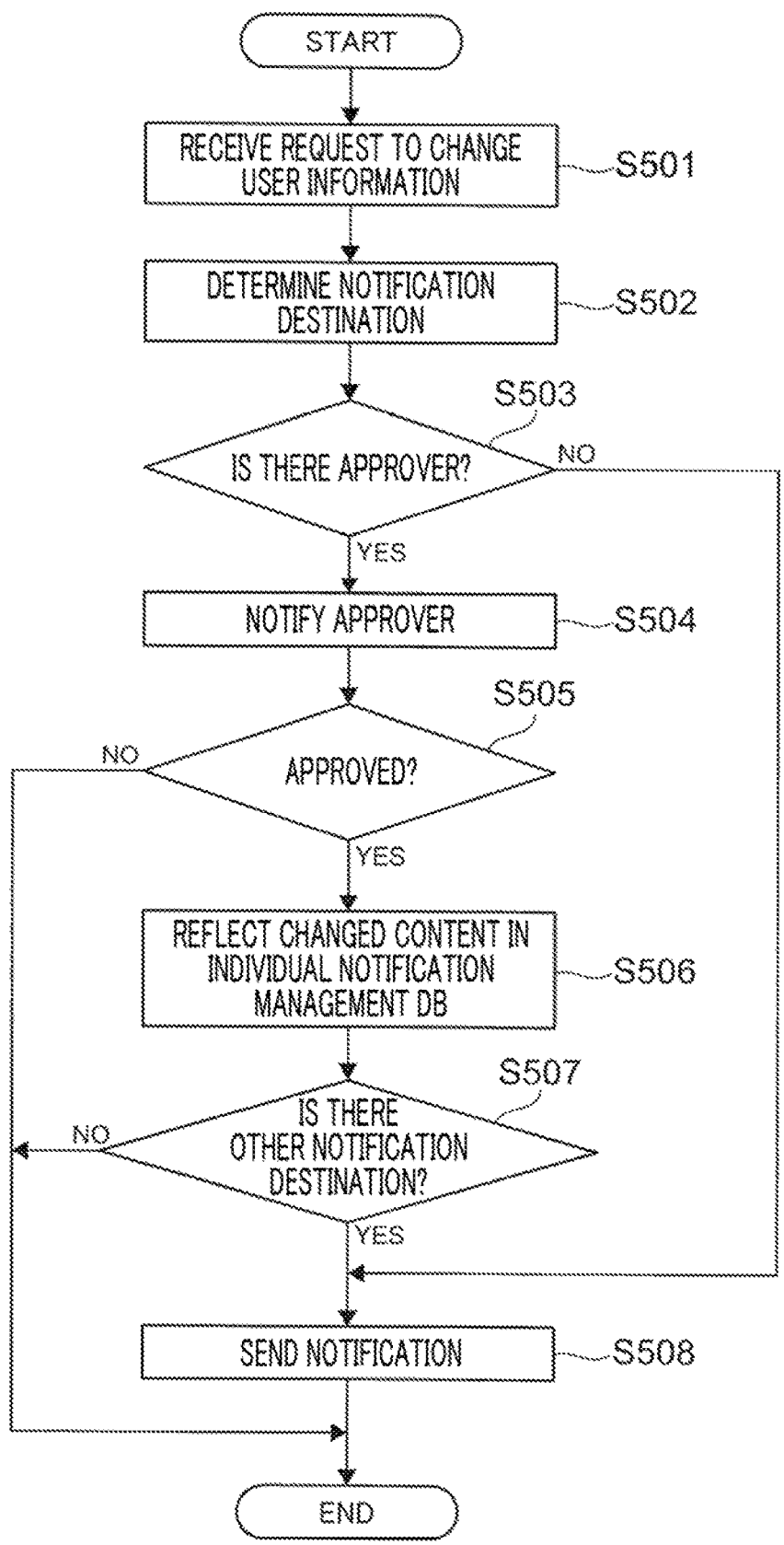
FIG. 5 is a flowchart showing operations of a notification control unit and a notification processing unit.

FIG. 5 is a flowchart showing the operations of the notification control unit 140 and the notification processing unit 150. When receiving a request to change user information (S501), the notification control unit 140 refers to the user information management DB 110 and the notification method management DB 120 to determine a notification destination (S502). If there is no approver at the notification destination (NO in S503), the notification processing unit 150 notifies the determined notification destination that the user information is to be changed (S508).

On the other hand, if there is an approver at the notification destination (YES in S503), the notification processing unit 150 first notifies the approver among the determined notification destinations that the user information is to be changed (S504). If the approver approves the change of the user information (YES in S505), the notification control unit 140 updates the individual notification management DB 130 to reflect the changed content (S506). Then, if there is no notification destination other than the approver (NO in S507), the processing is ended. If there is a notification destination other than the approver (YES in S507), the notification processing unit 150 notifies the remaining notification destinations that the user information is to be changed (S508), and then ends the processing.

After the approver is notified that the user information is to be changed, if an approval is not obtained from the approver (NO in S505), the notification control unit 140 does not update the individual notification management DB 130. In addition, notification is not performed even if there is a notification destination other than the approver.

Figure 6:
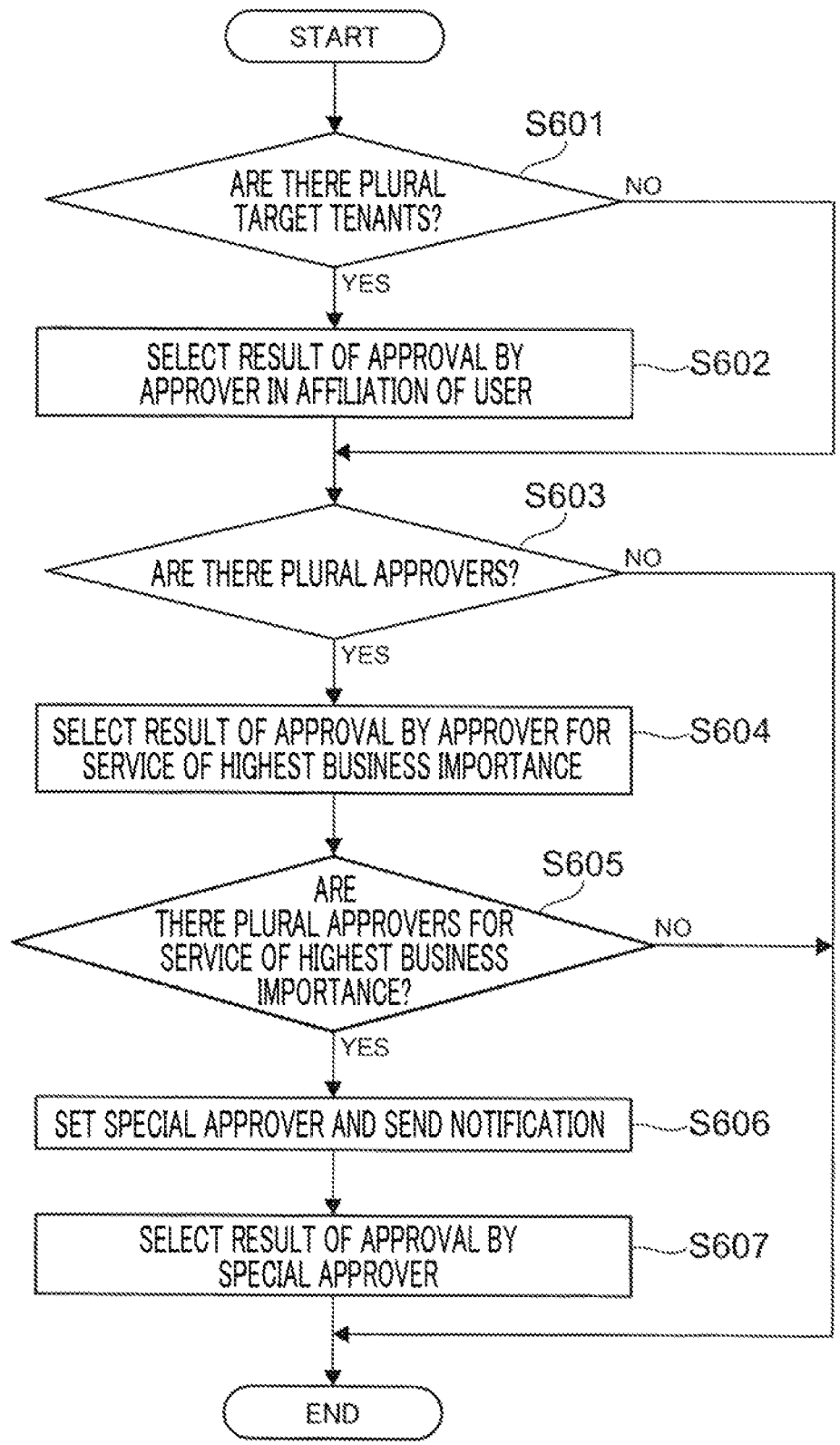
FIG. 6 is a flowchart showing a method of selecting a result of approval by the notification control unit in a case where there are plural approvers.

FIG. 6 is a flowchart showing a method of selecting an approval result by the notification control unit 140 in a case where there are plural approvers. In a case where there are plural approvers, an approval result is obtained for each approver, so that it is necessary to select one approval result to be adopted to make the determination in S505 of FIG. 5.

The notification control unit 140 first determines whether there are plural tenants (described as "target tenants" in FIG. 6) to which the approver belongs. If there are plural target tenants (YES in S601), the notification control unit 140 selects, as the approval result to be adopted, the result of approval by the approver in the target tenant to which the user belongs for the user information to be changed (S602).

If there is one target tenant (NO in S601) or there are plural approvers in the target tenant after the selection in S602 (YES in S603), the notification control unit 140 selects, as the approval result to be adopted, the result of approval by the approver who is the notification destination for the service of the highest business importance (S604).

If there are plural approvers for the service of the highest business importance (YES in S605), the notification control unit 140 sets a special approver and sends a notification (S606), and selects the result of approval by the special approver (S607). If there are not plural approvers in S603 and S605, the result of approval by the corresponding approver is adopted, and therefore the process is ended without selecting the approval result (NO in S603, and NO in S605). Based on one approval result selected as described above, the determination of S505 of FIG. 5 is performed.

Application Example

FIGS. 7A to 7C are diagrams showing an application example of notification control according to the present exemplary embodiment. FIG. 7A is a diagram showing a state in which there are plural approvers regarding services of different importance levels, FIG. 7B is a diagram showing a state in which there are plural approvers regarding services of same importance level, and FIG. 7C is a diagram showing a state in which services are used for businesses of plural tenants and each tenant has an approver. Hereinafter, with reference to FIGS. 7A to 7C, an example of selection of an approval result to be adopted in notification control will be described.

In the example shown in FIG. 7A, a change request is made for the user information of the user with the user ID "fx99999", and the changed user information is used in the service "TS" and the service "ET". Referring to FIG. 7A, any service is used in the business of the tenant A. Further, the notification level of the service "TS" is "1", and the notification level of the service "ET" is "2". Therefore, referring to the notification method management DB 120 shown in FIG. 3, the notification destination is the approver at any of the notification levels. Further, the business importance of the service "TS" is "large", the business importance of the service "ET" is "medium", and the business importance of the service "TS" is higher. That is, in the selection method shown in FIG. 6, the results are NO in S601, YES in S603, and NO in S605. Therefore, the notification control unit 140 adopts, as the approval result for the change of the user information, the result of approval by the administrator of the tenant A who is the notification destination of the service "TS" (notification level 1) with the highest business importance.

In the example shown in FIG. 7B, a change request is made for the user information of the user with the user ID "fx99999", and the changed user information is used in the service "CP" and the service "ET". Referring to FIG. 7B, any service is used in the business of the tenant A. Further, the notification levels of the service "CP" and the service "ET" are both "2", and any notification destination is an approver. Then, the business importance of the service "CP" and the service "ET" are both "medium" and equal. That is, in the selection method shown in FIG. 6, the results are NO in S601, YES in S603, and YES in S605. Therefore, the notification processing unit 150 sets the administrator of the tenant A to a special approver, as a person having a higher authority over the administrators of respective services that are the notification destinations of both services, and performs notification. Then, the notification control unit 140 adopts the result of approval by the administrator of the tenant A who is the special administrator, as the approval result for the change of the user information.

In the example shown in FIG. 7C, a change request is made for the user information of the user with the user ID "fx99999" belonging to the tenant A, and the changed user information is used in the service "TS". Then, in this example, as shown in FIG. 7C, the service "TS" using the user information of this user is used in the tenant A and the tenant B. Further, the notification level of the service "TS" is "1". Therefore, the notification destination is the tenant administrator and the approver. That is, in the selection method shown in FIG. 6, the results are YES in S601, NO in S603, and NO in S605. Therefore, the notification processing unit 150 adopts, as an approval result for the change of the user information, a result of approval by the administrator of the tenant A to which the user of the user ID "fx99999" belongs.

Although the exemplary embodiments of the present disclosure have been described above, the technical scope of the present disclosure is not limited to the above exemplary embodiments. For example, the items of the respective pieces of information managed in the user information management DB 110 shown in FIG. 2, the notification method management DB 120 shown in FIG. 3, and the individual notification management DB 130 shown in FIG. 4 are only examples, and may include items other than the items. Other various changes and configuration alternatives that do not deviate from the scope of the technical idea of the present disclosure fall within the present disclosure.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
 a user information management section that manages user information for use when a plurality of servers provide services on a network; and
 a control section that, when receiving a request to change the user information, performs control to change a method of notifying change of the user information, including at least a notification destination and a notification time specified for each service, based on a type of a service using the user information related to the change request and contents of the change of the user information according to the change request.

2. The information processing system according to claim 1, wherein
 the control section determines whether an approver of the change is included in a destination of notification of the change of the user information, and if the approver is included in the notification destination, the control section first sends a notification to the approver, and after the change of the user information is approved, controls the notification of the user information so as to send a notification to a destination other than the approver.

3. The information processing system according to claim 2, wherein
when there is a plurality of approvers for the change of the user information, the control section adopts a result of approval by the approver for a service with a highest degree of importance predetermined for each service using the user information, among the plurality of approvers.

4. The information processing system according to claim 3, wherein
when there is a plurality of the services with the highest degree of importance predetermined for each service using the user information and results of approval by the approvers for the plurality of services differ from each other, the control section sets, as a special approver, a person with a higher authority over the plurality of approvers and adopts a result of approval by the special approver.

5. The information processing system according to claim 1, wherein
the control section determines the notification method, based on an item of the user information, which is a change target of the change request, among the contents of the change of the user information according to the change request.

6. The information processing system according to claim 5, wherein
the control section determines the notification method, based on the item of the user information, which is the change target of the change request, and the contents of items of the user information other than the change target, among the contents of the change of the user information according to the change request.

7. A non-transitory computer readable medium storing a program causing a computer to execute an information processing process, the process comprising:
centrally managing user information for use when a plurality of servers provide services on a network; and
when receiving a request to change the user information, performing control to change a method of notifying change of the user information, including at least a notification destination and a notification time specified for each service, based on a type of a service using the user information related to the change request and contents of the change of the user information according to the change request.

* * * * *